United States Patent
Pollard et al.

(10) Patent No.: US 11,263,478 B2
(45) Date of Patent: Mar. 1, 2022

(54) SIGNATURE AUTHENTICATIONS BASED ON FEATURES

(71) Applicant: Hewlett-Packard Development Company, L.P., Houston, TX (US)

(72) Inventors: Stephen Pollard, Bristol (GB); Guy Adams, Bristol (GB); Steven Simske, Ft. Collins, CO (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 551 days.

(21) Appl. No.: 15/779,838

(22) PCT Filed: Apr. 7, 2016

(86) PCT No.: PCT/US2016/026428
§ 371 (c)(1),
(2) Date: May 29, 2018

(87) PCT Pub. No.: WO2017/176273
PCT Pub. Date: Oct. 12, 2017

(65) Prior Publication Data
US 2018/0365519 A1    Dec. 20, 2018

(51) Int. Cl.
*G06K 9/62* (2006.01)
*G06K 9/46* (2006.01)
*G06K 9/00* (2022.01)

(52) U.S. Cl.
CPC ....... *G06K 9/6228* (2013.01); *G06K 9/00577* (2013.01); *G06K 9/46* (2013.01);
(Continued)

(58) Field of Classification Search
CPC .... G06K 9/00577; G06K 9/46; G06K 9/6211; G06K 9/6215
See application file for complete search history.

(56) References Cited

U.S. PATENT DOCUMENTS 7,028,188 B1    4/2006    Moore
8,265,381 B2    9/2012    Ito
(Continued)

FOREIGN PATENT DOCUMENTS

CN    101477022    7/2009
CN    102037676    4/2011
(Continued)

OTHER PUBLICATIONS

Lowe, David G. "Distinctive Image Features from Scale—Invariant Keypoints." International Journal of Computer Vision, vol. 60, No. 2 Jan. 5, 2004 pp. 91-110.
(Continued)

*Primary Examiner* — Edward Park
(74) *Attorney, Agent, or Firm* — HP Inc. Patent Department

(57) ABSTRACT

An example system includes a feature extraction engine. The feature extraction engine is to determine a plurality of scale-dependent features for a portion of a target. The system also includes a signature-generation engine to select a subset of the plurality of scale-dependent features based on a strength of each feature. The signature-generation engine also is to store a numeric representation of the portion of the target and the subset of the plurality of scale-dependent features.

19 Claims, 6 Drawing Sheets

(52) U.S. Cl.
CPC .......... *G06K 9/6211* (2013.01); *G06K 9/6215* (2013.01); *G06K 2009/0059* (2013.01)

(56) References Cited

U.S. PATENT DOCUMENTS

| | | | |
|---|---|---|---|
| 8,842,916 | B2 | 9/2014 | Pollard et al. |
| 8,885,984 | B1* | 11/2014 | Lavi ...................... G06F 16/535 382/305 |
| 8,989,431 | B1 | 3/2015 | Erol et al. |
| 2005/0281454 | A1* | 12/2005 | Miyashita .............. G03F 9/7092 382/145 |
| 2011/0096955 | A1* | 4/2011 | Voloshynovskiy ..... G07F 7/086 382/103 |
| 2014/0136137 | A1* | 5/2014 | Tarshish-Shapir .......................... G01N 21/4788 702/108 |
| 2014/0146370 | A1 | 5/2014 | Banner et al. |
| 2014/0183854 | A1 | 7/2014 | Tian et al. |
| 2015/0117701 | A1 | 4/2015 | Ross et al. |
| 2015/0256339 | A1 | 9/2015 | Voloshynovskiy |
| 2016/0059489 | A1 | 3/2016 | Wang et al. |
| 2016/0316152 | A1* | 10/2016 | Pit Rada ................ G06T 11/001 |
| 2017/0300737 | A1* | 10/2017 | Wang .................... G06K 9/0063 |

FOREIGN PATENT DOCUMENTS

| | | |
|---|---|---|
| CN | 102332165 | 1/2012 |
| EP | 2866194 | 4/2015 |
| WO | WO-2010134919 | 11/2010 |
| WO | WO-2013028185 | 2/2013 |
| WO | WO-2013119233 | 8/2013 |
| WO | WO-2013119234 | 8/2013 |
| WO | WO-2013119235 | 8/2013 |
| WO | WO-2015047977 A1 | 4/2015 |

OTHER PUBLICATIONS

Adams, Guy et al., "2D Barcode Sub-Coding Density Limits," HP Laboratories, Oct. 6, 2011.

Adams, Guy et al., "A study of the interaction of paper substrates on printed forensic imaging," DocEng '11 Proceedings of the 11th ACM symposium on Document engineering Sep. 19, 2011 pp. 263 266 ACM New York NY.

Graham, Sarah, "Paper's Natural 'Fingerprint' Could Be Built-In Passport Protection," Scientific American, Jul. 28, 2005.

Pollard, Stephen et al., "Model Based Print Signature Profile Extraction for Forensic Analysis of Individual Text Glyphs," HP Laboratories, Oct. 21, 2010.

Pollard, Stephen et al., "Print biometrics: Recovering forensic signatures from halftone images," Pattern Recognition (ICPR), 2012 21st International Conference on, Nov. 11, 2012 pp. 1651-1654 IEEE Tsukuba Japan.

Sharma, Ashlesh et al., "PaperSpeckle: Microscopic fingerprinting of paper," CCS '11 Proceedings of the 18th ACM conference on Computer and communications security, Oct. 17, 2011 pp. 99-110 ACM Chicago IL.

Simske, Steven et al., "High-Resolution Glyph-Inspection Based Security System," 2010 IEEE International Conference on Acoustics, Speech and Signal Processing, Mar. 14, 2010 pp. 1794 1797 IEEE Dallas TX.

Tan, L. et al.; "Robust Text Hashing for Content-based Document Authentication"; Jun. 14, 2011; http://scialert.net/qredirect.php?doi= itj.2011.1608.1613&linkid=pdf.

Wu, C.W. et al.; "Limitations and Requirements of Content-based Multimedia Authentication Systems"; Nov. 17, 2000; http://domino watson ibm com/library/cyberdig nsf/papers/ 5D3845E5E0EF45B1852569AB.

Zhu, Baoshi et al., "Print Signatures for Document Authentication," CCS '03 Proceedings of the 10th ACM conference on Computer and communications security, Oct. 27, 2003 pp. 145 154 ACM New York NY.

Jiangping,"Gas Source Localization by Fusing A Mobile Robot's Vision/Olfaction Information", Aug. 2010, pp. 8-41.

Sun Bei, "Study On Vision-Based Underwater Object Recognition", Dec. 2014.

* cited by examiner

SIGNATURE AUTHENTICATIONS BASED ON FEATURES

BACKGROUND

A printer may receive data representative of print content, and the printer may produce a print target based on the print content. As used herein, the term "print target" refers to an output from a printer. For example, the print target may include a two-dimensional print, a three-dimensional print, or the like. The term "target" refers to a document or manufactured object whether or not produced by a printer. The term "content" or "print content" refers to information to be intentionally included in the target or print target by the person producing the target or by the printer producing the print target. For example, the print content may include text, images, etc. to be formed on a two-dimensional print; a structure, material, etc. of a three-dimensional print; text, images, colors, etc. on a surface of the three-dimensional print; or the like.

DETAILED DESCRIPTION

Targets such as print targets may be easily duplicated, or multiple targets may be produced from identical content. Since the content may be identical or nearly so, it may be difficult to distinguish the targets from one another. Accordingly, it may also be difficult to authenticate a particular target to prevent or identify substitution of a forgery (e.g., a different target containing identical content or minor modifications to the content). For example, an authentic document may contain important information, but a forger may be able to forge or print a forged document with modified information and substitute the forged document for the authentic document. Users of the authentic document that are relying on the information contained therein may have difficulty determining the forged document has been substituted for the original and thus whether the information can be relied upon.

To ensure the authenticity of the target, a forensic signature unique to the target may be generated from the target. The target can be authenticated by regenerating the forensic signature from the target and ensuring the regenerated forensic signature matches the originally generated forensic signature. The forensic signature may be based on a forensic mark to be included in the print content before a print target is printed, but such a forensic signature may not be usable to authenticate historic targets. Similarly, it may be difficult to include a forensic mark in three-dimensional print targets or manufactured objects. Moreover, the forensic mark or surrounding area may be authenticatable, but other areas of the target may not be authenticatable. Target authentication may be improved by a forensic signature that is robustly locatable, does not require a forensic mark in the content, and can be based on multiple distinct locations in the target.

Figure 1:
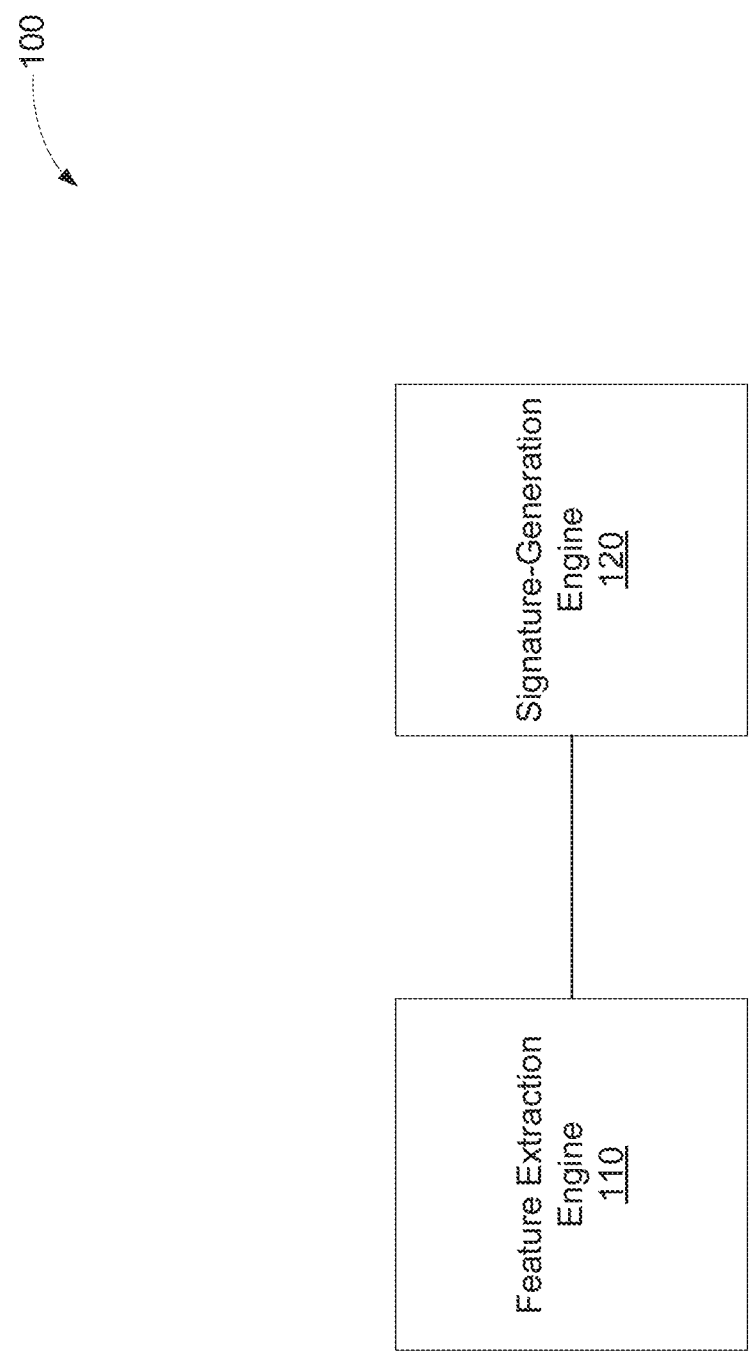
FIG. 1 is a block diagram of an example system to generate a signature unique to a particular target.

FIG. 1 is a block diagram of an example system 100 to generate a signature unique to a particular target. The system 100 may include a feature extraction engine 110. As used herein, the term "engine" refers to hardware (e.g., a processor, such as an integrated circuit or other circuitry) or a combination of software (e.g., programming such as machine- or processor-executable instructions, commands, or code such as firmware, a device driver, programming, object code, etc.) and hardware. Hardware includes a hardware element with no software elements such as an application specific integrated circuit (ASIC), a Field Programmable Gate Array (FPGA), etc. A combination of hardware and software includes software hosted at hardware (e.g., a software module that is stored at a processor-readable memory such as random access memory (RAM), a hard-disk or solid-state drive, resistive memory, or optical media such as a digital versatile disc (DVD), and/or executed or interpreted by a processor), or hardware and software hosted at hardware.

The feature extraction engine 110 may determine a plurality of scale-dependent features for a portion of a target. In an example, the feature extraction engine 110 may examine properties of gray levels for the portion of the target, and the feature extraction engine 110 may identify the features based on the properties of the gray levels. As used herein, the term "feature" refers to extrema in the properties of the gray levels for the portion of the target. The feature may be scale-dependent. As used herein, the term "scale-dependent features" refers to features identified at particular size scales.

The system 100 may also include a signature-generation engine 120. The signature-generation engine 120 may select a subset of the plurality of scale-dependent features based on a strength of each feature. As used herein, the term "feature strength" refers to a magnitude of the property of the gray level at the location of that feature. The signature-generation engine 120 may select features with a strength above a particular threshold, a predetermined number of strongest features, the lesser or greater of the number of features with a strength above a particular threshold and a predetermined number of strongest features, or the like. The signature-generation engine 120 may apply additional criteria when selecting the subset. For example, the signature-generation engine 120 may omit strong features that fail to satisfy the requirements of the additional criteria.

The signature-generation engine 120 may store a numeric representation of the portion of the target and a numeric representation of the subset of the plurality of scale-dependent features. For example, the signature-generation engine 120 may store the numeric representation of the portion of the target and the subset of the plurality of scale-dependent features in a local persistent storage device, in a remote persistent storage device, on the target, or the like. The numeric representation of the portion of the target may include information usable to identify the portion of the target. The numeric representation of the subset of the plurality of scale-dependent features may include information usable to identify the scale-dependent features. For example, the numeric representations of the portion of the target and the subset of the plurality of scale-dependent features may be usable as a signature to authenticate the target in the future.

Figure 2:
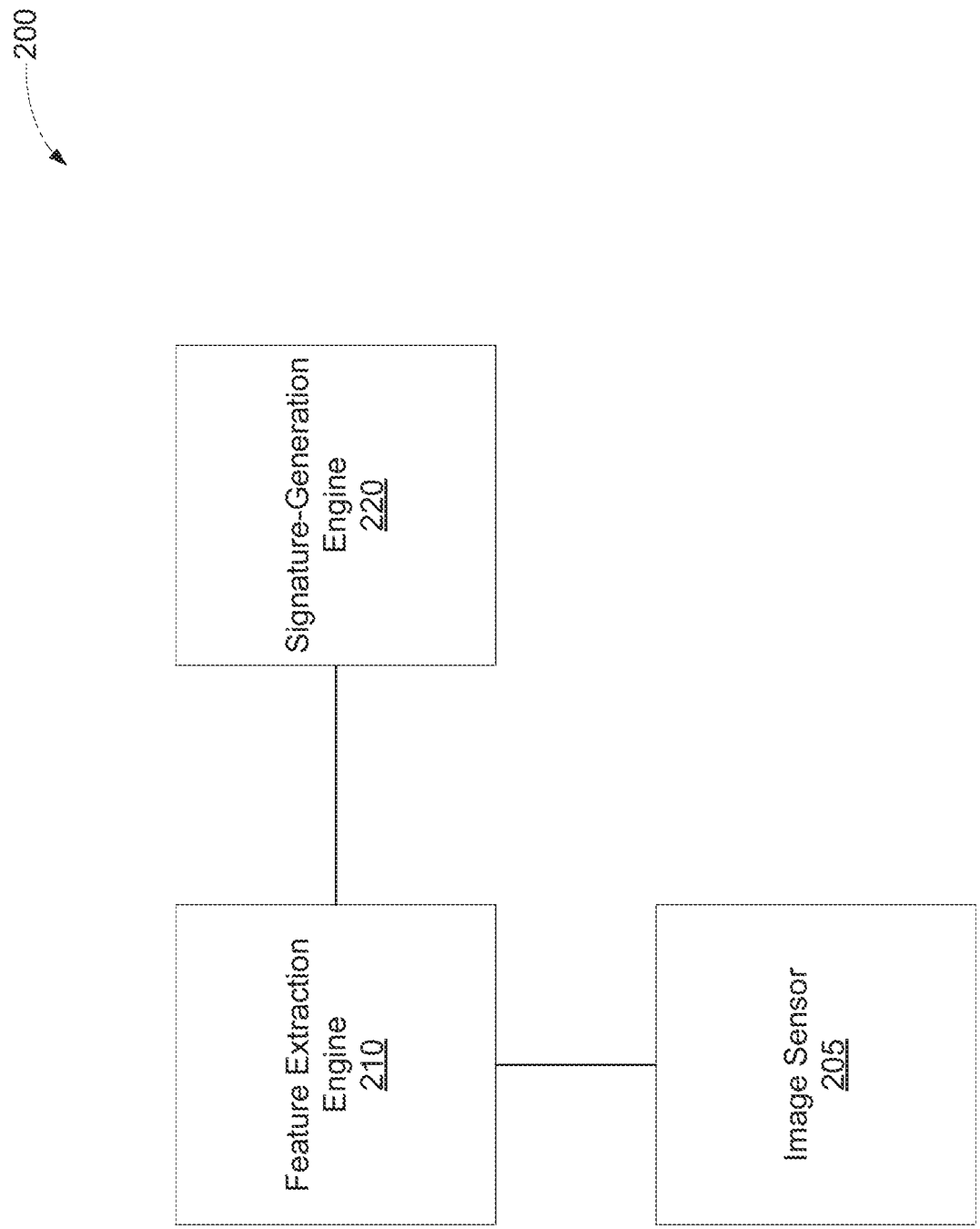
FIG. 2 is a block diagram of another example system to generate or authenticate a signature unique to a particular target.

FIG. 2 is a block diagram of another example system 200 to generate or authenticate a signature unique to a particular target (e.g., a particular print target). The system 200 may include an image sensor 205. The image sensor 205 may be usable to capture an image of the portion of the target. For example, the image sensor 205 may capture high-resolution images with a small field of view. The image captured by the image sensor 205 may define or include the portion of the target. Alternatively, or in addition, the portion of the target may be spread over multiple images, which may be of adjacent areas of the target, distinct areas of the target separated from each other, or the like. The image may be of the surface of a two-dimensional or three-dimensional print.

The system 200 may also include a feature extraction engine 210. The feature extraction engine 210 may determine a plurality of scale-dependent features for the portion of the target. For example, the feature extraction engine 210 may determine the plurality of scale-dependent features based on the image captured by the image sensor 205. The feature extraction engine 210 may identify the features based on properties of gray levels for the portion of the target. The feature extraction engine 210 may analyze the properties of the gray levels of the image to determine the properties of the gray levels for the portion of the target.

The feature extraction engine 210 may apply a scale-dependent feature extraction process to the image to determine the features. For example, the feature extraction engine 210 may convolve the image with a plurality of Gaussian convolution kernels to produce a corresponding plurality of filtered images (e.g., low-pass filtered images or the like). The Gaussian kernels may be at distinct but nearby scales. For example, the scales of the Gaussian kernels may be in a small frequency range, may be at a pair of frequencies (e.g., a base standard deviation and a multiple of the base standard deviation, etc.), or the like. The multiple may be 1.25, 1.5, 2, 2.5, 3, etc. The feature extraction engine 210 may subtract the plurality of filtered images from one another to produce a difference image or a plurality of difference images. The feature extraction engine 210 may search the difference image or plurality of difference images for local extrema. The local extrema may be identified as features. If there is a single difference image, the local extrema may be compared to a spatial neighborhood only rather than being compared to neighboring pixels in other scales. Alternatively, or in addition, the feature extraction engine 210 may convolve the image with a single Gaussian kernel and determine extrema in the resultant image.

The band-pass properties of the difference of Gaussian image may cause the feature extraction engine 210 to detect features over a small range of frequencies without detecting features at other frequencies. The range of frequencies may be selected to be reproducibly detectable across multiple images of the portion of the target while remaining distinct between the target and duplicates of the target. For example, high frequencies may be affected by image noise, such as image noise introduced from capturing an image of the portion of the target. Accordingly, high frequency features may vary between images of the same target. Low frequencies may be affected by print content. Thus, low frequency features may be identical between the target and duplicates of the target. The feature extraction engine 210 may determine the features over a range of frequencies low enough to limit detecting of features corresponding to noise and high enough to limit detecting of features present in duplicates of the target. The feature extraction engine 210 may not detect the features at the higher and lower frequencies. The determined features may correspond to unique variations in the printing process or the material of the target rather than corresponding to the print content or noise.

The system 200 may include a signature-generation engine 220. The signature-generation engine 220 may select a subset of the plurality of scale-dependent features. For example, the signature-generation engine 220 may select the subset based on a strength of each feature, based on a distance between feature locations, based on a polarity of the features, or the like. In an example, the signature-generation engine 220 may select the strongest features for inclusion in the subset. The signature-generation engine 220 may select features separated in location by at least a predetermined distance for inclusion in the subset. For example, if two strong features are located within the predetermined distance of each other, only the stronger of the two features may be included in the subset. The signature-generation engine 220 may consider polarity when determining whether features are located within the predetermined distance of each other. Thus, in some examples, the signature-generation engine 220 may select a feature corresponding to a maximum despite being within the predetermined distance of a feature corresponding to a minimum. The signature-generation engine 220 may select no more than a predetermined number of features with a strength above a predetermined threshold.

The signature-generation engine 220 may store a numeric representation of the portion of the target and a numeric representation of the subset of the plurality of scale-dependent features. The numeric representation of the portion of the target may be usable to locate a corresponding portion of a purported target when authenticating the purported target. In an example, the numeric representation of the portion of the target may be a low-resolution thumbnail image of the portion of the target. For example, the image sensor 205 may include a low-resolution display that can be used to display a ghost image of the thumbnail that can be aligned with a live feed from the image sensor 205. Once the user has aligned the ghost image of the thumbnail on the display with the live feed image of the purported target, the user may instruct the image sensor 205 to capture an image of the portion of the purported target. The image of the portion of the target can then be used to authenticate the purported target.

The numeric representation of the subset of the plurality of scale-dependent features may be usable to authenticate the target. For example, the signature-generation engine 220 may determine a descriptor for each feature in the subset. Alternatively, or in addition, the descriptor for each feature in the plurality may be determined before selecting the subset. As used herein, the term "descriptor" refers to a numeric representation of the properties of the gray levels at or near a feature, such as a numeric representation of scale dependent and orientation invariant properties of the image. In an example, the signature-generation engine 220 may calculate the descriptor based on the magnitude or orientation of the gradient at pixels surrounding the feature in the Gaussian filtered or difference of Gaussian image. For example, the descriptor may include a plurality of histograms of orientations of pixels in a plurality of sub-regions surrounding the feature. In some examples, the signature-generation engine 220 may store the descriptors for the features in the subset, the locations of the features in the subset, an indication of the range of frequencies at which the features were determined, or the like, e.g., as an authentication signature.

The system 200 may also authenticate signatures in some examples. The image sensor 205 may be used to capture an image of a portion of a purported target. The image sensor 205 may capture an image of a portion selected based on the numeric representation of the portion of the target. The image sensor 205 may automatically determine the portion based on the numeric representation, or the image sensor 205 may indicate the numeric representation to a user, who may determine the portion to be captured. There may be some misregistration (e.g., translation, rotation, etc.) between the image used to generate the signature for the target and the image used to authenticate the purported target.

The feature extraction engine 210 may determine a plurality of scale-dependent features for the image of the portion of the purported target. For example, the feature extraction engine 210 may determine the plurality of scale-dependent features based on the stored indication of the range of frequencies at which the features were determined. Alternatively, the feature extraction engine 210 may determine the plurality of scale-dependent features based on a predetermined range of frequencies not stored with the descriptors, locations, etc. The feature extraction engine 210 may determine the features during authentication in the same manner in which it determined the features during generating of the signature.

The signature-generation engine 220 may compare the features determined by the feature extraction engine 210 to the signature to determine authenticity of the purported target. The signature-generation engine 220 may or may not select a subset of the plurality of scaled-dependent features for comparison to the signature. For example, the signature-generation engine 220 may use a looser strength threshold than during generation or no strength threshold, a looser distance threshold than during generation or no distance threshold, or the like when selecting the features. The number of features selected by the signature-generation engine 220 may be much larger than the number of features included in the subset. The signature-generation engine 220 may determine feature descriptors for the features.

The signature-generation engine 220 may select a subset of the plurality of scale-dependent features based on a comparison of the scale-dependent features to a predetermined set of features (e.g., the features of the previously generated signature). In an example, the signature-generation engine 220 may select the subset with descriptors having a smallest mathematically determined distance from the descriptors included in the signature. For example, the mathematically determined distance may be computed by summing the square distances between the descriptor of each feature in the subset and a corresponding descriptor in the signature. Alternatively, or in addition, the distance between the subsets of descriptors or between individual descriptors may be computed as a Euclidean distance, a sum of absolute distances, a root mean square distance, a hamming distance, a weighted distance (e.g., a Mahalanobis distance, etc.), or the like.

In some examples, the signature-generation engine 220 may force affine consistency among the features selected as having the smallest mathematically determined distance or force consistency to a subset of affine transforms (e.g., scaling, rotation, translation, etc.). For example, the signature-generation engine 220 may compare the locations of the features in the signature to the locations of features in a possible subset to ensure the two sets of locations map to each other under an affine transform. A subset may not be selected if it is not an affine transform of the features in the signature. The signature-generation engine 220 may apply a loose threshold for determining whether the selected subset is an affine transform. For example, the signature-generation engine 220 may include up to a predetermined number of features in the subset that fail to satisfy the affine transform, may include features with up to a predetermined error distance (e.g., 5 pixels, 10 pixels, 20 pixels, etc.), may allow up to a predetermined total error, or the like. In an example, the signature-generation engine 220 may determine a best affine transform based on a random sample consensus approach. Random affine transforms may be generated based on finding a transform that maps a random set of the stored features (e.g., a pair, a triple, a quadruple, etc.) to a set of features in the image to be authenticated. The random affine transform may be tested against all remaining stored features or features in the image to be authenticated to find as many inliers as possible (e.g., features with matches satisfying the loose threshold). The random affine transform with the most inliers may be selected. The inliers may be used to refine the affine transform further, e.g., using a least squares approach. When determining whether an individual feature matches another, the matches may be limited using absolute or relative thresholds limiting the allowable distance between descriptors of the features (e.g., using a distance metric previously discussed).

The signature-generation engine 220 may determine whether the purported target is authentic based on whether a threshold is satisfied by the mathematically determined distance calculated for the subset having the smallest mathematically determined distance. For example, the signature-generation engine 220 may determine the purported target is authentic if the smallest mathematically determined distance is less than or no greater than the threshold and is not authentic if the smallest mathematically determined distance is no less than or greater than the threshold. In some examples, the signature-generation engine 220 may generate a single signature or a plurality of signatures based on images of a plurality of portions of the target. The signature-generation engine 220 may determine whether the purported target is authentic based on whether all the portions are determined to be authentic, at least a predetermined number or percentage of the portions are determined to be authentic, a selected subset of the portions are determined to be authentic, or the like. In some examples, the signature-generation engine 220 may determine a location, with or without a forensic mark, that corresponds to an additional signature usable to authenticate the purported target. The signature generation engine 220 may determine the location based on the affine transform recovered and a location of at least a feature. The signature-generation engine 220 may determine whether the purported target is authentic based on the signature comprising the features and the additional signature, just the additional signature, or the like.

Accordingly, the system 200 may be able to generate a signature for a target and authenticate the target based on the signature. The system 200 may be able to use any portion of the target as the basis for the signature. Accordingly, the content may be secured in addition to the target itself. The system 200 may not need an additional forensic mark. Thus, the system 200 may generate signatures for historic targets without extra printing. The system 200 may be usable to authenticate a three-dimensional print target or manufactured object based on an image of a surface of the three-dimensional print target or manufactured object. The system 200 may generate multiple signatures from a single target. The number and location of signatures may not be readily apparent from viewing the target. The system 200 can also be used in combination with other forms of document serialization, (e.g., one-dimensional and two-dimensional barcodes, etc.).

Figure 3:
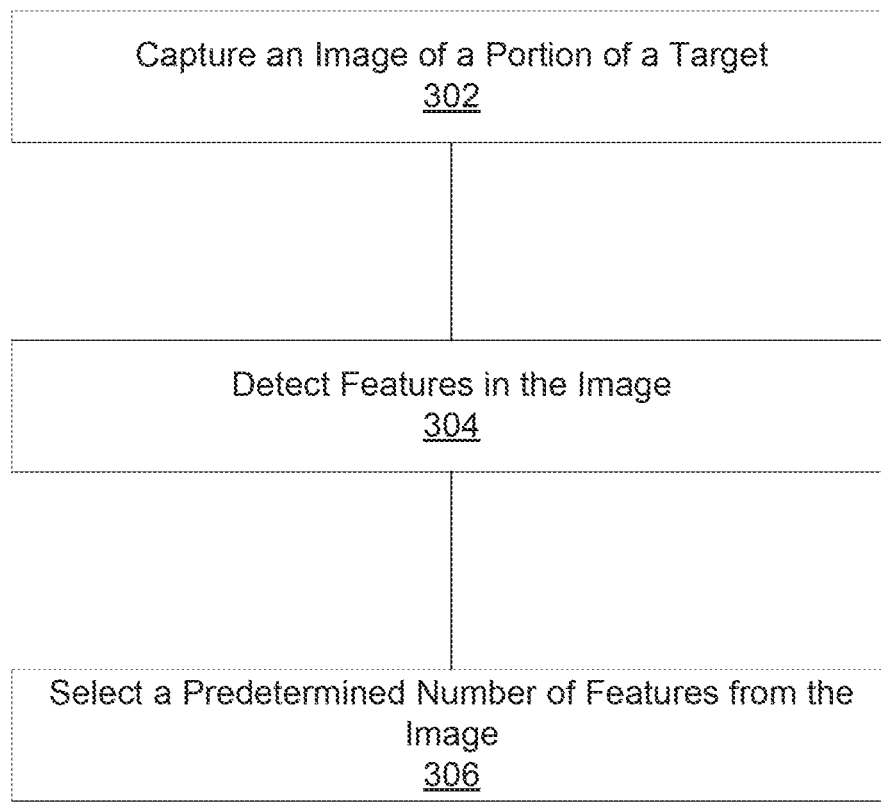
FIG. 3 is a flow diagram of an example method to generate a signature unique to a particular target.

FIG. 3 is a flow diagram of an example method 300 to generate a signature unique to a particular target A processor may perform the method 300. At block 302, the method 300 may include capturing an image of a portion of a target. For example, the portion of the target may be selected for use in generating a signature. An image may be captured of the selected portion.

Block 304 may include detecting features in the image. The features may be detected based on properties of gray levels of the image. For example, the properties of the gray levels of the image may be computed for a plurality of locations in the image. The computed properties of the gray levels may be searched for values indicative of an image element usable to authenticate the image. For example, the computed properties of the gray levels may be searched for extrema in the properties of the gray levels.

Block 306 may include selecting a predetermined number of features from the image. Selecting the predetermined number of features may include selecting features separated in location from each other by at least a predetermined distance. For example, a location may be computed for each detected feature. A distance between locations may be computed for each pair of features. The features may be selected or not selected based on whether the distance is less than or no greater than a threshold. For example, only one of the pair may be selected if the features are closer than the threshold. Referring to FIG. 2, for example, the image sensor 205 may perform block 302, the feature extraction engine 210 may perform block 304, and the signature-generation engine 220 may perform block 306.

Figure 4:
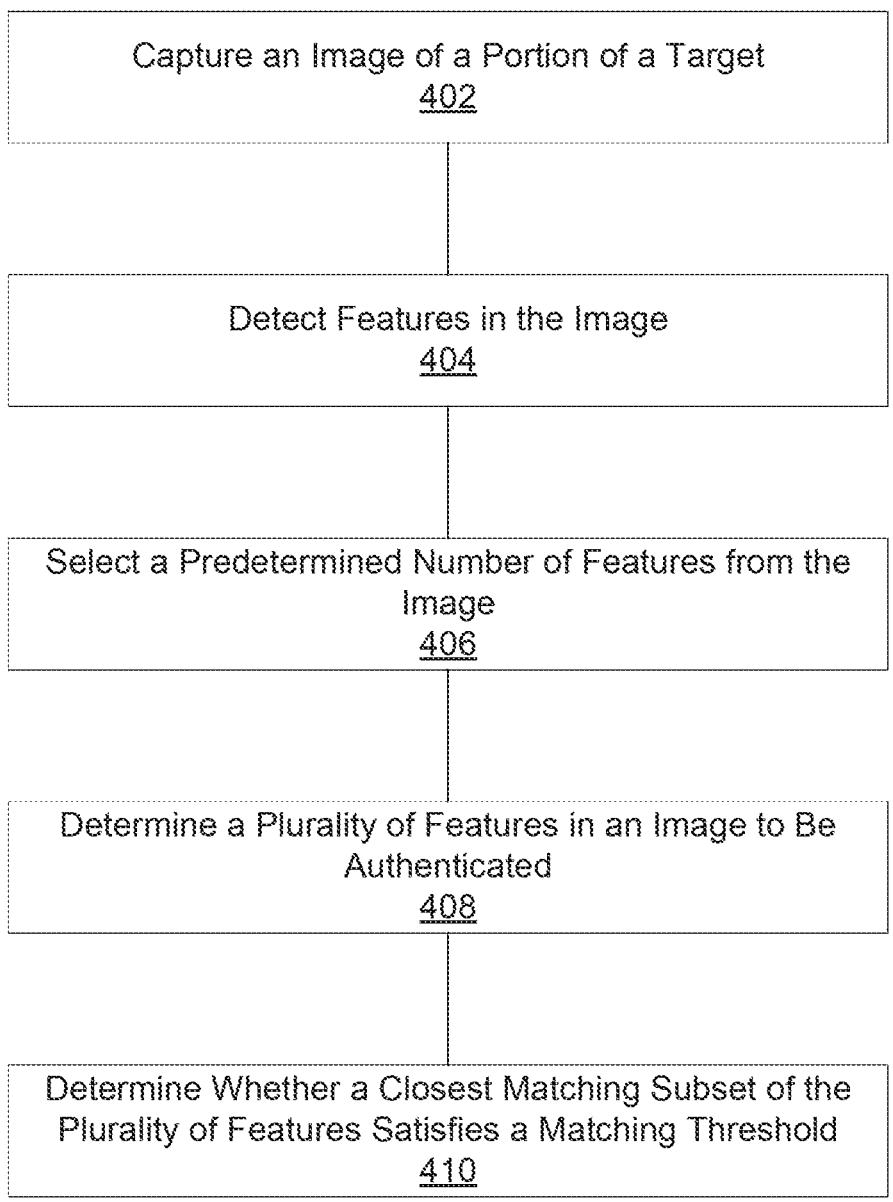
FIG. 4 is a flow diagram of another example method to generate or authenticate a signature unique to a particular target.

FIG. 4 is a flow diagram of another example method 400 to generate or authenticate a signature unique to a particular target. A processor may perform the method 400. At block 402, the method 400 may include capturing an image of a portion of the target. For example, the image may be captured using an image sensor. Block 404 may include detecting features in the image. The features may be detected at a particular range of frequencies. For example, detecting features may include convolving the image with a plurality of Gaussian functions having standard deviations corresponding to cutoff frequencies in the range of frequencies (e.g., a pair of cutoff frequencies at the beginning and end of the range, etc.).

The particular range of frequencies may be selected to maximize performance of the generated signature. For example, at high frequencies, features corresponding to noise from the capturing may be detected, and the signature may produce false negatives during authentication. At low frequencies, features corresponding to print content may be detected, and the signature may produce false positives during authentication. Thus, detecting features may include detecting the features at a range of frequencies low enough to limit detecting of features corresponding to noise from the capture and high enough to limit detecting of features present in duplicates of the target. Detecting features may not be done at high and low frequencies. Detecting features may include selecting a range of frequencies that results in detecting features resulting from unique variations in the print process or material of the target without detecting features resulting from noise or the print content. The particular range of frequencies may be selected based on a desired trade-off between false positives and false negatives. Alternatively, or in addition, the particular range of frequencies may be selected to maximize a separation between valid and false comparisons. For example, the particular range of frequencies may be selected to maximize a separation between an average false comparison and average valid comparison, between a median false comparison and a median valid comparison, or the like.

At block 406, the method 400 may include selecting a predetermined number of features from the image. The predetermined number of features may be selected based on a distance between the feature locations, based on polarity, based on feature strength, or the like. For example, selecting the features may include selecting the features from strongest to weakest until the predetermined number of features has been selecting. If, while selecting the features, it is determined that a particular feature is located within a predetermined distance of a previous (and hence stronger) feature, then that particular feature may be discarded. Polarity may be considered when determining whether a feature is located within a predetermined distance of another feature. Features may only be compared to features of the same polarity when determining whether they are located within the predetermined distance. Descriptors of the features, locations of the features, or the like may be used as a signature.

The method 400 may also include authenticating an image purportedly of the target. For example, at block 408, the method 400 may include determining a plurality of features in the image to be authenticated. The plurality of features may be determined without regard to the distance between feature locations. For example, the predetermined distance relied upon in selecting the predetermined number of features at block 406 may not disqualify features determined at block 408. Even if features are located within the predetermined distance of each other, they may still be included in the plurality of features. Determining the plurality of features in the image to be authenticated may include determining a plurality of features much larger in number than the predetermined number of features. Determining a much larger number may make authentication more robust to noise.

Block 410 may include determining whether a subset of the plurality of features closest matching the predetermined number of features satisfies a matching threshold. For example, a matching metric (e.g., a distance or the like) may be used to determine which subset of the plurality is a closest match to the predetermined number of features. The matching metric may be compared to the matching threshold to determine whether the matching metric satisfies the matching threshold. For example, the purported target may be determined to be authentic if the matching metric is less than the matching threshold. The matching threshold may be selected based on a desired rate of false positives or false negatives. In an example, the image sensor 205 of FIG. 2 may perform block 402; the feature extraction engine 210 may perform blocks 404 and 408; and the signature-generation engine 220 may perform blocks 406 and 410.

Figure 5:
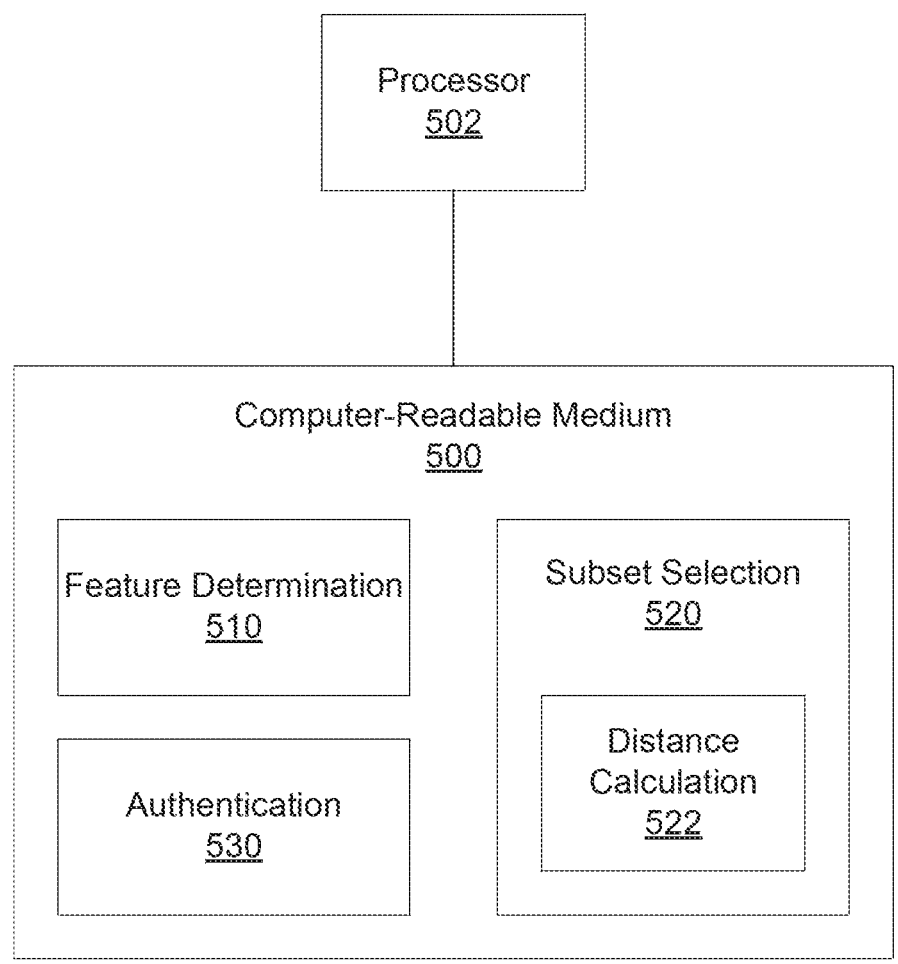
FIG. 5 is a block diagram of an example computer-readable medium including instructions that cause a processor to authenticate a purported target based on a predetermined set of features.

FIG. 5 is a block diagram of an example computer-readable medium 500 including instructions that, when executed by a processor 502, cause the processor 502 to authenticate a purported target based on a predetermined set of features. The computer-readable medium 500 may be a non-transitory computer readable medium, such as a volatile computer readable medium (e.g., volatile RAM, a processor cache, a processor register, etc.), a non-volatile computer readable medium (e.g., a magnetic storage device, an optical storage device, a paper storage device, flash memory, read-only memory, non-volatile RAM, etc.), and/or the like. The processor 502 may be a general purpose processor or special purpose logic, such as a microprocessor, a digital signal processor, a microcontroller, an ASIC, an FPGA, a programmable array logic (PAL), a programmable logic array (PLA), a programmable logic device (PLD), etc.

The computer-readable medium 500 may include a feature determination module 510. As used herein, a "module" (in some examples referred to as a "software module") is a set of instructions that when executed or interpreted by a processor or stored at a processor-readable medium realizes a component or performs a method. The feature determination module 510 may include instructions that cause the processor 502 to determine a plurality of scale dependent features for a portion of a target. For example, the feature determination module 510 may cause the processor 502 to determine properties of gray levels for the portion of the target. The feature determination module 510 may cause the processor 502 to determine image elements usable to authenticate the portion of the target based on the properties of the gray levels (e.g., extrema in the properties of the gray levels or the like).

The computer-readable medium 500 may include a subset selection module 520. The subset selection module 520 may cause the processor 502 to select a subset of the plurality of scale-dependent features with descriptors having a smallest mathematically determined distance from descriptors of a predetermined set of features. For example, the subset selection module 520 may include a distance calculation module 522 to cause the processor 502 to determine the distance between descriptors of features. The descriptor may include a multidimensional vector, and the distance calculation module 522 may cause the processor 502 to apply a distance function to compute a distance between the multidimensional vectors. The subset selection module 520 may cause the processor 502 analyze the distances to determine which subset of the plurality of scale-dependent features has descriptors with a smallest mathematically determined distance from the descriptors of the predetermined set of features.

The computer-readable medium 500 may include an authentication module 530. The authentication module 530 may cause the processor 502 to determine an authenticity of the target based on whether the smallest mathematically determined distance satisfies a threshold. For example, when determining which subset has the smallest mathematically determined distance, the subset selection module 520 may cause the processor 502 to determine the value of the smallest mathematically determined distance. The authentication module 530 may cause the processor 502 to receive the mathematically determined distance calculated for the subset with the smallest mathematically determined distance. The authentication module 530 may cause the processor 502 to compare the mathematically determined distance to the threshold. In an example, if the mathematically determined distance is less than or no greater than the threshold, the authentication module 530 may cause the processor 502 to determine that the target is authentic. Referring to FIG. 1, the feature determination module 510, when executed by the processor 502, may realize the feature extraction engine 110, for example, and the subset selection module 520 or authentication module 530, when executed by the processor 502, may realize the signature-generation engine 120, for example.

Figure 6:
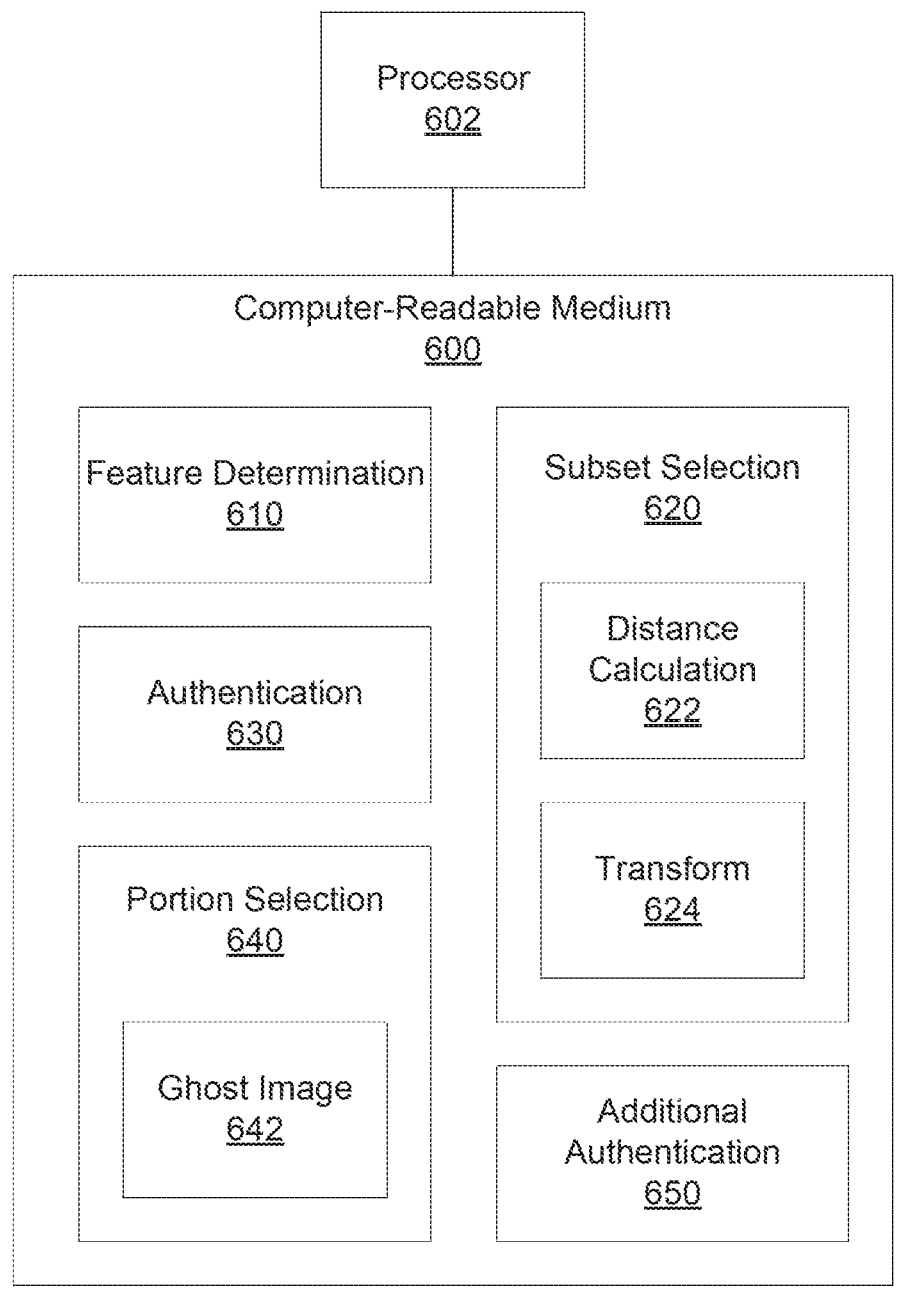
FIG. 6 is a block diagram of another example computer-readable medium including instructions that cause a processor to authenticate a purported target based on a predetermined set of features.

FIG. 6 is a block diagram of another example computer-readable medium 600 including instructions that, when executed by a processor 602, cause the processor 602 to authenticate a purported target based on a predetermined set of features. The computer-readable medium 600 may include a portion selection module 640. The portion selection module 640 may cause the processor 602 to select a portion of the purported target to use in authenticating the target. For example, the portion selection module 640 may include a ghost image module 642. The ghost image module 642 may cause the processor 602 to cause display of a ghost image that aligns with the portion of the target to a user. For example, the ghost image may include a previously captured image of the portion of an authentic target. The ghost image module 642 may cause the processor 602 to produce the ghost image by lightening the previously captured image, forming an outline of edges in the previously captured image, or the like. The ghost image module 642 may cause the processor 602 to instruct a display device to display the ghost image. The portion selection module 640 may cause the processor 602 to receive a user-selected image of the portion of the target. For example, the ghost image module 642 may cause the processor 602 to overlay the ghost image on a live image and instruct the display device to display the overlaid image. The user may align the ghost image with the live image and select the live image when the images are aligned.

The computer-readable medium 600 may include a feature determination module 610. The feature determination module 610 may cause the processor 602 to determine a plurality of scale-dependent features for a portion of a target. In an example, the feature determination module 610 may cause the processor 602 to generate a difference of Gaussian image. The feature determination module 610 may cause the processor 602 to convolve the image with a plurality of Gaussian kernels and to subtract the results to produce the difference of Gaussian image. The Gaussian kernels may be at a pair of frequencies, within a small range of frequencies, or the like. The feature determination module 610 may cause the processor 602 to determine the scale-dependent features by detecting locations of extrema in the difference of Gaussian image.

The computer-readable medium 600 may include a subset selection module 620. The subset selection module 620 may cause the processor 602 to select a subset of the plurality of scale-dependent features with descriptors having a smallest mathematically determined distance from descriptors of a predetermined set of features. For example, the subset selection module 620 may include a distance calculation module 622. The distance calculation module 622 may cause the processor 602 to calculate the distance between descriptors of individual features, the distance between descriptors of a first plurality of features and a second plurality of features, or the like. The distance calculation module 622 may cause the processor 602 to calculate the distance between individual descriptors, between pluralities of descriptors, or the like based on a Euclidean distance, a squared Euclidean distance, a sum of absolute distances, a root mean square distance, a hamming distance, a weighted distance (e.g., a Mahalanobis distance, etc.), or the like. The subset selection module 620 may cause the processor 602 to determine which subset of the plurality of scale-dependent features includes descriptors that are a smallest mathematically determined distance from the descriptors of the predetermined set of features based on distance calculations of the distance calculation module 622.

The subset selection module 620 may include a transform module 624. When selecting the subset with the smallest mathematically determined distance, the subset selection module 620 may cause the processor 602 to select the subset of the plurality of scale-dependent features based on locations of features in the subset approximately mapping to locations of the predetermined set of features under an affine transform. The transform module 624 may cause the processor 602 to determine whether locations of features approximately map under an affine transform. The subset selection module 620 may cause the processor 602 to select the subset with the smallest mathematically determined distance from among the subsets with feature locations approximately corresponding to an affine transform of the locations of the predetermined set of features. Alternatively, or in addition, the subset selection module 620 may cause the processor 602 to select a subset of features that minimizes errors in the descriptor distances and the location distances relative to the predetermined set of features. In an example, the subset selection module 620 may cause the processor 602 to apply a random sample consensus method to determine a best affine transform that approximately maps features in the plurality of scale-dependent features to features with similar descriptors in the predetermined set of features. The transform module 624 may cause the processor 602 to determine that locations of features approximately map if corresponding locations are within a predetermined distance of each other, if fewer than a predetermined number of locations fail to map, if an error metric is less than a predetermined threshold, or the like.

The computer-readable medium 600 may include an authentication module 630. The authentication module 630 may cause the processor 602 to determine an authenticity of the target based on whether the smallest mathematically determined distance satisfies a threshold. For example, the threshold may be a predetermined threshold selected based on a desired rate of false positives or false negatives. The authentication module 630 may cause the processor 602 to determine the target is authentic if the distance is less than or no greater than the threshold. The computer-readable medium 600 may also include an additional authentication module 650. In some examples, the target may include a location, with or without a forensic mark, that corresponds to an additional signature, which may use a different authentication scheme. The additional authentication module 650 may cause the processor 602 to determine the location of the forensic mark in the target based on the affine transform. For example, the additional authentication module 650 may cause the processor 602 to receive the affine transform from the transform module 624. The additional authentication module 650 may cause the processor 602 to determine the location corresponding to the additional signature based on the affine transform and a previously stored location relative to at least one of the predetermined set of features. In some examples, the additional authentication module 650 may cause the processor 602 to authenticate the target based on the forensic mark and the additional signature. In an example, the feature determination module 610, when executed by the processor 602, may realize the feature extraction engine 210 of FIG. 2; the subset selection module 620, distance calculation module 622, transform module 624, authentication module 630, or additional authentication module 650, when executed by the processor 602, may realize the signature-generation engine 220; and the location tracking module 640 or ghost image module 642, when executed by the processor 602, may realize the image sensor 205.

The above description is illustrative of various principles and implementations of the present disclosure. Numerous variations and modifications will become apparent to those skilled in the art once the above disclosure is fully appreciated. Accordingly, the scope of the present application should be determined only by the following claims.

What is claimed is:

1. A system, comprising:
   a feature extraction engine to convolve a kernel with an image of a portion of a target to determine a plurality of scale-dependent features for the portion of the target; and
   a signature-generation engine to:
      select a subset of the plurality of scale-dependent features based on a strength of each feature, and
      store a numeric representation of the portion of the target and the subset of the plurality of scale-dependent features.

2. The system of claim 1, wherein the feature extraction engine is to determine the plurality of scale-dependent features in a small frequency range without determining features at frequencies other than the small frequency range.

3. The system of claim 2, further comprising an image sensor to capture the image of the portion of the target, wherein the feature extraction engine determines the plurality of scale-dependent features based on the image.

4. The system of claim 3, wherein the plurality of scale-dependent features in the small frequency range are reproducibly detectable across multiple images of the portion of the target and distinct between the target and duplicates of the target.

5. The system of claim 1, wherein the target is selected from the group consisting of a two-dimensional print and a three-dimensional print.

6. The system of claim 1, wherein the feature extraction engine is to determine the plurality of scale-dependent features by identifying local extrema.

7. The system of claim 6, wherein the feature extraction engine is to compute a difference of Gaussians based on the image and to determine the plurality of scale-dependent features by identifying local extrema in the difference of Gaussians, and wherein the signature-generation engine is to select a strongest feature to include in the subset.

8. A method, comprising:
   capturing an image of a portion of a target;
   convolving using a processor, a kernel with the image to identify scale-dependent features in the image;
   selecting, using the processor, a predetermined number of the scale-dependent features from the image, the scale-dependent features separated in location by at least a predetermined distance; and
   generating a signature based on the predetermined number of the scale-dependent features.

9. The method of claim 8, wherein detecting the scale-dependent features comprises detecting the scale-dependent features at a small frequency range low enough to limit detecting of features corresponding to noise from the capturing and high enough to limit detecting of features present in duplicates of the target without detecting the features at high and low frequencies.

10. The method of claim 8, wherein detecting the scale-dependent features comprises detecting features resulting from unique variations in a printing process without detecting features resulting from print content.

11. The method of claim 8, wherein selecting the scale-dependent features separated in location by at least the predetermined distance comprises selecting scale-dependent features of a first polarity separated from each other by the predetermined distance and selecting scale-dependent features of a second polarity separated from each other by the predetermined distance regardless of distances between scale-dependent features of different polarities.

12. The method of claim 8, further comprising authenticating an image purportedly of the target, wherein authenticating comprises:
   determining a plurality of scale-dependent features without regard to distance between feature locations, the plurality much larger than the predetermined number, and
   determining whether a subset of the plurality of scale-dependent features closest matching the predetermined number of scale-dependent features satisfies a matching threshold.

13. The method of claim 8, further comprising identifying local extrema in an image generated based on the convolving to identify the scale-dependent features.

14. A non-transitory computer-readable medium comprising instructions that, when executed by a processor, cause the processor to:
   convolve a kernel with an image of a portion of a target to determine a plurality of scale-dependent features for the portion of the target;
   select a subset of the plurality of scale-dependent features with descriptors having a smallest mathematically determined distance from descriptors of a predetermined set of features; and
   determine an authenticity of the target based on whether the smallest mathematically determined distance satisfies a threshold.

15. The computer-readable medium of claim 14, wherein the instructions cause the processor to select the subset based on locations of the subset of scale-dependent features approximately mapping to locations of the predetermined set of features under an affine transform.

16. The computer-readable medium of claim 14, further comprising instructions that cause the processor to determine a location corresponding to an additional signature in the target, wherein the instructions cause the processor to determine the location based on the affine transform.

17. The computer-readable medium of claim 14, wherein the instructions cause the processor to compute the smallest mathematically determined distance by calculating the Euclidean distances between the descriptor of each feature in the subset and the descriptor of the corresponding feature in the predetermined set.

18. The computer-readable medium of claim 14, further comprising instructions that cause the processor to:
   cause display of a ghost image that aligns with the portion of the target to a user; and
   receive a user-selected image of the portion of the target.

19. The non-transitory computer-readable medium of claim 14, further comprising instructions that cause the processor to identify local extrema to identify the scale-dependent features.

\* \* \* \* \*